(12) United States Patent
Yoshino et al.

(10) Patent No.: US 8,976,864 B2
(45) Date of Patent: Mar. 10, 2015

(54) VIDEO ENCODING APPARATUS, VIDEO ENCODING METHOD, AND COMPUTER PROGRAM

(75) Inventors: Tomonobu Yoshino, Saitama-ken (JP); Sei Naitou, Saitama-ken (JP)

(73) Assignee: KDDI Corporation, Tokyo (JP)

( * ) Notice: Subject to any disclaimer, the term of this patent is extended or adjusted under 35 U.S.C. 154(b) by 384 days.

(21) Appl. No.: 13/402,319

(22) Filed: Feb. 22, 2012

(65) Prior Publication Data

US 2012/0224636 A1  Sep. 6, 2012

(30) Foreign Application Priority Data

Mar. 4, 2011 (JP) ................................. 2011-047060

(51) Int. Cl.
| H04N 11/02 | (2006.01) |
| H04N 19/557 | (2014.01) |
| H04N 19/80 | (2014.01) |
| H04N 19/523 | (2014.01) |

(52) U.S. Cl.
CPC .............. *H04N 19/557* (2014.11); *H04N 19/80* (2014.11); *H04N 19/523* (2014.11)
USPC .................. 375/240.16; 375/240.02

(58) Field of Classification Search
CPC .................... H04N 19/0089; H04N 19/00909; H04N 7/26377; H04N 7/26382; H04N 7/26888; H04N 7/0135; H04N 7/0145; H04N 7/46; H04N 7/461; H04N 7/462
See application file for complete search history.

(56) References Cited

U.S. PATENT DOCUMENTS

| 8,811,484 B2* | 8/2014 | Motta et al. ............... 375/240.16 |
| 2004/0076333 A1 | 4/2004 | Zhang et al. |
| 2012/0093217 A1* | 4/2012 | Jeon et al. ................. 375/240.02 |
| 2012/0155533 A1* | 6/2012 | Puri et al. .................. 375/240.02 |
| 2013/0142262 A1* | 6/2013 | Ye et al. .................... 375/240.16 |

FOREIGN PATENT DOCUMENTS

| JP | 2004-147328 A | 5/2004 |
| WO | 2006 108654 A2 | 10/2006 |
| WO | WO 2010114283 A2 * | 10/2010 ............... H04N 7/24 |

OTHER PUBLICATIONS

Joint Video Team (JVT) of ISO/IEC MPEG and ITU-T VCEG, "Text of ISO/IEC 14496-10 Advanced Video Coding," Jul. 2004.
Thomas Wedi, "Adaptive Interpolation Filters and High-Resolution Displacements for Video Coding," IEEE Trans. on Circuits and Systems for Video Technology, vol. 16, No. 4, Apr. 2006.

(Continued)

*Primary Examiner* — Christopher S Kelley
*Assistant Examiner* — Christopher Findley
(74) *Attorney, Agent, or Firm* — BainwoodHuang

(57) ABSTRACT

A video encoding apparatus, video encoding method, and computer program, which are capable of employing an adaptive filter that provides improved encoding performance while reducing the processing cost required for calculation. A video encoding apparatus estimates interpolation filter coefficients by means of an image frequency characteristic analysis. When a loop continuation condition is satisfied, the video encoding apparatus performs re-estimation of the interpolation filter coefficients. As the loop continuation condition, a first condition can be used, in which the number of times the re-estimation has been consecutively performed for the current frame to be processed is smaller than a predetermined number, for example.

14 Claims, 4 Drawing Sheets

(56) References Cited

OTHER PUBLICATIONS

Tomonobu Yoshino, et al., "Low-comlexity Scheme for Adaptive Interpolation Filter Based on Amplitude Characteristic Analysis", ICIP2010, Sep. 2010.
K. Ugur, et al., Video coding technology proposal by Tandberg, Nokia, and Ericsson:, JCTVC-A119, Apr. 2010.
M. Karczewicz, et al., "Video coding technology proposal by Qualcomm", JCTVC-A121, Apr. 2010.
K. McCann, et al., "Video coding technology proposal by Samsung (and BBC)", JCTVC-A124, Apr. 2010.
Yoshino, et al., "Low-complexity Scheme for Adaptive Interpolation Filter Based on Amplitude Characteristic Analysis," Proceedings of 2010 IEEE 17th International Conference on Image Processing, Sep. 26-29, 2010, Hong Kong, pp. 2053-2056.

* cited by examiner

VIDEO ENCODING APPARATUS, VIDEO ENCODING METHOD, AND COMPUTER PROGRAM

This application is based on and claims the benefit of priority from Japanese Patent Application No. 2011-047060, filed on Mar. 4, 2011, the content and teachings of which are incorporated by reference herein in their entirety.

BACKGROUND OF THE INVENTION

1. Field of the Invention

The present invention relates to a video encoding apparatus, a video encoding method, and a computer program.

2. Description of the Related Art

Joint Video Team (JVT) of ISO/IEC MPEG and ITU-T VCEG, "Text of ISO/IEC 14496-10 Advanced Video Coding," July 2004, discloses a standard method for video compression which allows an inter-frame prediction to be performed. With such an inter-frame prediction, a region having a pattern similar to that of an encoding target region is detected from an image which has already been encoded, and the pixel values of the region thus detected are used as the predicted values of the encoding target region. In the following description, the processing for obtaining the prediction error that occurs in an inter-frame prediction will be referred to as "motion compensation". Also, a spatial vector that indicates the offset from an encoding target region to a similar region which has already been encoded will be referred to as an "MV (Motion Vector)".

With the method disclosed in Joint Video Team (JVT) of ISO/IEC MPEG and ITU-T VCEG, in a similar region detection operation (motion estimation operation), pixel values at intermediate positions (fractional position accuracy) are also generated by an interpolation operation in addition to the pixel values at integer sampling positions (integer position accuracy), and the pixel values thus generated by the interpolation operation can also be used as predicted values. The technique disclosed in Joint Video Team (JVT) of ISO/IEC MPEG and ITU-T VCEG provides an inter-frame prediction with quarter-pixel precision.

Also, a method (method using an adaptive interpolation filter) has been proposed in Thomas Wedi, "Adaptive Interpolation Filters and High-Resolution Displacements for Video Coding," IEEE Trans. on Circuits and Systems for Video Technology, Vol. 16, No. 4, April 2006, in which processing is performed on a video pattern or the like in an adaptive manner, which is to be applied to interpolation processing (processing using an interpolation filter) used in an operation for performing motion estimation with fractional pixel position accuracy. Such a technique described in Thomas Wedi provides improved encoding performance as compared with the technique described in the aforementioned Joint Video Team (JVT) of ISO/IEC MPEG and ITU-T VCEG.

SUMMARY OF THE INVENTION

Such a method disclosed in Thomas Wedi requires a heavy processing cost. On the other hand, there is a great demand for a video encoding apparatus or video decoding apparatus which is capable of encoding or decoding a moving image in a real time manner. Accordingly, in order to apply such an adaptive interpolation filter to such a video encoding apparatus or video decoding apparatus, such an arrangement requires a reduction in the processing cost required to calculate interpolation filter coefficients.

In contrast, Tomonobu Yoshino et al., "Low-complexity Scheme for Adaptive Interpolation Filter Based on Amplitude Characteristic Analysis", ICIP2010, September 2010 discloses a method for estimating interpolation filter coefficients that correspond to feature values by analyzing the video features. As compared with the method disclosed in Thomas Wedi, such a method requires only a small processing cost to calculate interpolation filter coefficients having characteristics that are similar to those of the interpolation filter coefficients calculated using the method disclosed in Thomas Wedi. However, in some cases, such a method has a problem in that the estimation precision, which depends on the video features, becomes degraded. In some cases, this leads to a problem in that the calculated interpolation filter coefficients are unsuitable. Applying an unsuitable interpolation filter having such unsuitable interpolation filter coefficients leads to degradation of the encoding performance.

Accordingly, the present invention has been made in order to solve the aforementioned problem. It is a purpose of the present invention to provide a video encoding apparatus, a video encoding method, and a computer program, which allow an adaptive filter to be applied so as to provide improved encoding performance while reducing the required calculation processing cost.

For purposes of summarizing the invention, certain aspects of the invention have been described herein. It is to be expressly understood that it is not intended as a definition of the limits of the invention.

The present invention proposes the following embodiments in order to solve the aforementioned problem.

An embodiment of the present invention proposes a video encoding apparatus (which corresponds to a video encoding apparatus AA shown in FIG. 1, for example) configured to allow filtering processing to be performed for a predicted value in an inter-frame prediction. The video encoding apparatus comprises: a filter coefficient calculation unit (which corresponds to a filter coefficient estimation unit 21 shown in FIG. 2, for example) configured to calculate fractional pixel motion compensation interpolation filter coefficients, with fractional pixel position accuracy, based upon results of a frequency characteristic analysis of an input image and an encoded image; a prediction performance evaluation unit (which corresponds to an estimated filter prediction performance evaluation unit 23 shown in FIG. 2, for example) configured to evaluate motion compensation prediction performance with respect to the interpolation filter coefficients calculated by the filter coefficient calculation unit; and a filter coefficient control unit (which corresponds to a filter coefficient control unit 24 shown in FIG. 2, for example) configured to judge whether or not recalculation of the interpolation filter coefficients is to be performed by the filter coefficient calculation unit, based upon an evaluation result obtained by the prediction performance evaluation unit. When judgment is made by the filter coefficient control unit that recalculation is to be performed (which corresponds to a case in which judgment has been made in Step S3 shown in FIG. 3 that the loop continuation condition is satisfied, for example), the filter coefficient calculation unit performs recalculation of the interpolation filter coefficients using the interpolation filter coefficients on the basis of which judgment was made that recalculation was to be performed. Furthermore, when judgment is made by the filter coefficient control unit that recalculation is to be performed, the prediction performance evaluation unit evaluates motion compensation prediction performance with respect to the interpolation filter coefficients calculated in the recalculation performed by the filter coefficient calculation unit, using the motion vector information and the encoded image that were used by the filter coefficient calculation unit to calculate the interpolation filter coefficients on the basis of which judgment was made that recalculation was to be performed.

The video encoding apparatus according to the present invention, configured to allow filtering processing to be performed for a predicted value in an inter-frame prediction comprises a filter coefficient calculation unit, a prediction performance evaluation unit, and a filter coefficient control unit. With such an arrangement, the filter coefficient calculation unit is configured to calculate the fractional pixel motion compensation interpolation filter coefficients, with fractional pixel position accuracy, based upon the results of a frequency characteristic analysis of the input image and the encoded image. In particular, when the filter coefficient control unit judges that recalculation is to be performed, the filter coefficient calculation unit performs recalculation of the interpolation filter coefficients using the interpolation filter coefficients on the basis of which judgment was made that recalculation was to be performed. Furthermore, in this case, the prediction performance evaluation unit evaluates the motion compensation prediction performance with respect to the interpolation filter coefficients calculated by the filter coefficient calculation unit. In particular, when the filter coefficient control unit judges that recalculation is to be performed, the motion compensation prediction performance is evaluated with respect to the interpolation filter coefficients calculated in the recalculation performed by the filter coefficient calculation unit, using the motion vector information and the encoded image that were used by the filter coefficient calculation unit to calculate the interpolation filter coefficients on the basis of which judgment was made that recalculation was to be performed.

Another embodiment of the present invention relates to a video encoding method for allowing filtering processing to be performed for a predicted value in an inter-frame prediction. The video encoding method comprises: a first step (which corresponds to processing performed by the filter coefficient estimation unit 21 shown in FIG. 2, for example) in which motion compensation filter coefficients are calculated, with fractional pixel position accuracy, based upon results of a frequency characteristic analysis of an input image and an encoded image; a second step (which corresponds to processing performed by the estimated filter prediction performance evaluation unit 23 shown in FIG. 2, for example) in which motion compensation prediction performance is evaluated with respect to the interpolation filter coefficients calculated in the first step; and a third step (which corresponds to processing performed by the filter coefficient control unit 24 shown in FIG. 2, for example) in which judgment is made regarding whether or not recalculation of the interpolation filter coefficients is to be performed in the first step, based upon evaluation results obtained in the second step. When judgment is made in the third step that recalculation is to be performed (which corresponds to a case in which judgment has been made in Step S3 shown in FIG. 3 that the loop continuation condition is satisfied, for example), the recalculation of the interpolation filter coefficients is performed in the first step using the interpolation filter coefficients on the basis of which judgment was made that recalculation was to be performed. Furthermore, when judgment is made in the third step that recalculation is to be performed, motion compensation prediction performance is evaluated in the second step with respect to the interpolation filter coefficients calculated in the recalculation performed in the first step, using motion vector information and the encoded image that were used in the first step to calculate the interpolation filter coefficients on the basis of which judgment was made that recalculation was to be performed.

With embodiments of the invention, first, the fractional pixel motion compensation interpolation filter coefficients are calculated, with fractional pixel position accuracy, based upon the results of a frequency characteristic analysis of the input image and the encoded image. Next, the motion compensation prediction performance is evaluated with respect to the interpolation filter coefficients thus calculated. Next, judgment is made based upon the evaluation result regarding whether or not recalculation of the interpolation filter coefficients is to be performed. When judgment is made that recalculation is to be performed, recalculation of the interpolation filter coefficients is performed using the interpolation filter coefficients on the basis of which judgment was made that recalculation was to be performed. Furthermore, in this case, motion compensation prediction performance is evaluated with respect to the interpolation filter coefficients calculated in the recalculation, using the motion vector information and the encoded image that were used to calculate the interpolation filter coefficients on the basis of which judgment was made that recalculation was to be performed.

Yet another embodiment of the present invention provides a computer program product having a non-transitory computer readable medium storing a program which, when executed by a computer, causes the computer to perform a method for allowing filtering processing to be performed for a predicted value in an inter-frame prediction. The method including: a first step (which corresponds to processing performed by the filter coefficient estimation unit 21 shown in FIG. 2, for example) in which motion compensation filter coefficients are calculated, with fractional pixel position accuracy, based upon results of a frequency characteristic analysis of an input image and an encoded image; a second step (which corresponds to processing performed by the estimated filter prediction performance evaluation unit 23 shown in FIG. 2, for example) in which motion compensation prediction performance is evaluated with respect to the interpolation filter coefficients calculated in the first step; and a third step (which corresponds to processing performed by the filter coefficient control unit 24 shown in FIG. 2, for example) in which judgment is made regarding whether or not recalculation of the interpolation filter coefficients is to be performed in the first step, based upon evaluation results obtained in the second step. When judgment is made in the third step that recalculation is to be performed (which corresponds to a case in which judgment has been made in Step S3 shown in FIG. 3 that the loop continuation condition is satisfied, for example), the recalculation of the interpolation filter coefficients is performed in the first step using the interpolation filter coefficients on the basis of which judgment was made that recalculation was to be performed. Furthermore, when judgment is made in the third step that recalculation is to be performed, motion compensation prediction performance is evaluated in the second step with respect to the interpolation filter coefficients calculated in the recalculation performed in the first step, using motion vector information and the encoded image that were used in the first step to calculate the interpolation filter coefficients on the basis of which judgment was made that recalculation was to be performed.

With embodiments of the invention, such an arrangement instructs the computer to execute the program so as to perform the following operations. First, the fractional pixel motion compensation interpolation filter coefficients are calculated, with fractional pixel position accuracy, based upon the results of a frequency characteristic analysis of the input image and the encoded image. Next, the motion compensation prediction performance is evaluated with respect to the interpolation filter coefficients thus calculated. Next, judgment is made based upon the evaluation result regarding whether or not recalculation of the interpolation filter coefficients is to be performed. When judgment is made that recalculation is to be performed, recalculation of the interpolation filter coefficients is performed using the interpolation filter coefficients on the basis of which judgment was made that recalculation was to be performed. Furthermore, in this case, motion compensation prediction performance is evaluated with respect to the interpolation filter coefficients calculated in the recalculation, using the motion vector information and the encoded image that were used to calculate the interpolation filter coefficients on the basis of which judgment was made that recalculation was to be performed.

With embodiments of the present invention, such an arrangement provides improved encoding performance while reducing the processing cost required to calculate the interpolation filter coefficients.

DETAILED DESCRIPTION OF THE INVENTION

Description will be made below regarding embodiments of the present invention with reference to the drawings. It should be noted that each of the components of the following embodiments can be replaced by a different known component or the like as appropriate. Also, any kind of variation may be made including a combination with other known components. That is to say, the following embodiments described below do not intend to limit the content of the present invention described in the appended claims.

Figure 1:
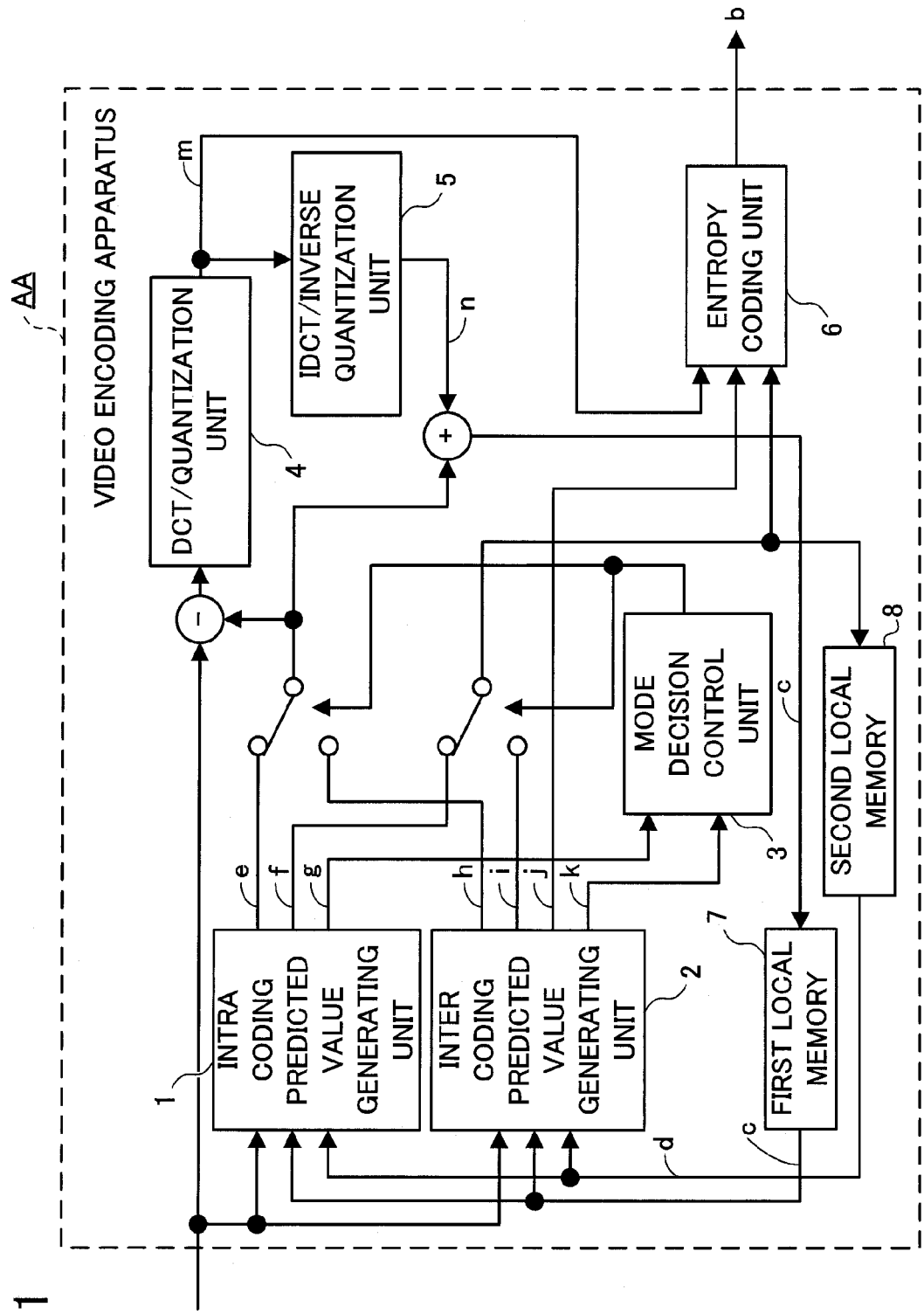
FIG. 1 is a block diagram which shows a configuration of a video encoding apparatus according to an embodiment.

FIG. 1 is a block diagram which shows a configuration of a video encoding apparatus AA according to a first embodiment of the present invention. The video encoding apparatus AA includes an intra coding predicted value generating unit 1, an inter coding predicted value generating unit 2, a mode decision control unit 3, a DCT/quantization unit 4, an IDCT/inverse quantization unit 5, an entropy coding unit 6, first local memory 7, and second local memory 8.

The intra coding predicted value generating unit 1 receives, as input signals, an input video image a, a local decoded value c with respect to an encoded block, and prediction information d with respected to the encoded block. The intra coding predicted value generating unit 1 generates a predicted value based upon the local decoded value c with respect to the encoded block, and calculates the difference between the predicted value thus generated and the input signal so as to calculate the encoding distortion. In the following step, an encoding cost value g required for the encoding is calculated based upon the encoding distortion thus calculated and the prediction information d with respected to the encoded block. Subsequently, the intra coding predicted value generating unit 1 outputs the intra predicted value e, the intra prediction information f (including motion vector), and the encoding cost value g.

The inter coding predicted value generating unit 2 receives, as input signals, the input video image a, the local decoded value c with respect to the encoded block, and the prediction information d with respected to the encoded block. The inter coding predicted value generating unit 2 outputs an inter predicted value h, inter prediction information (including motion vector) i, interpolation filter coefficients j, and an encoding cost value k, based upon the input data.

Figure 2:
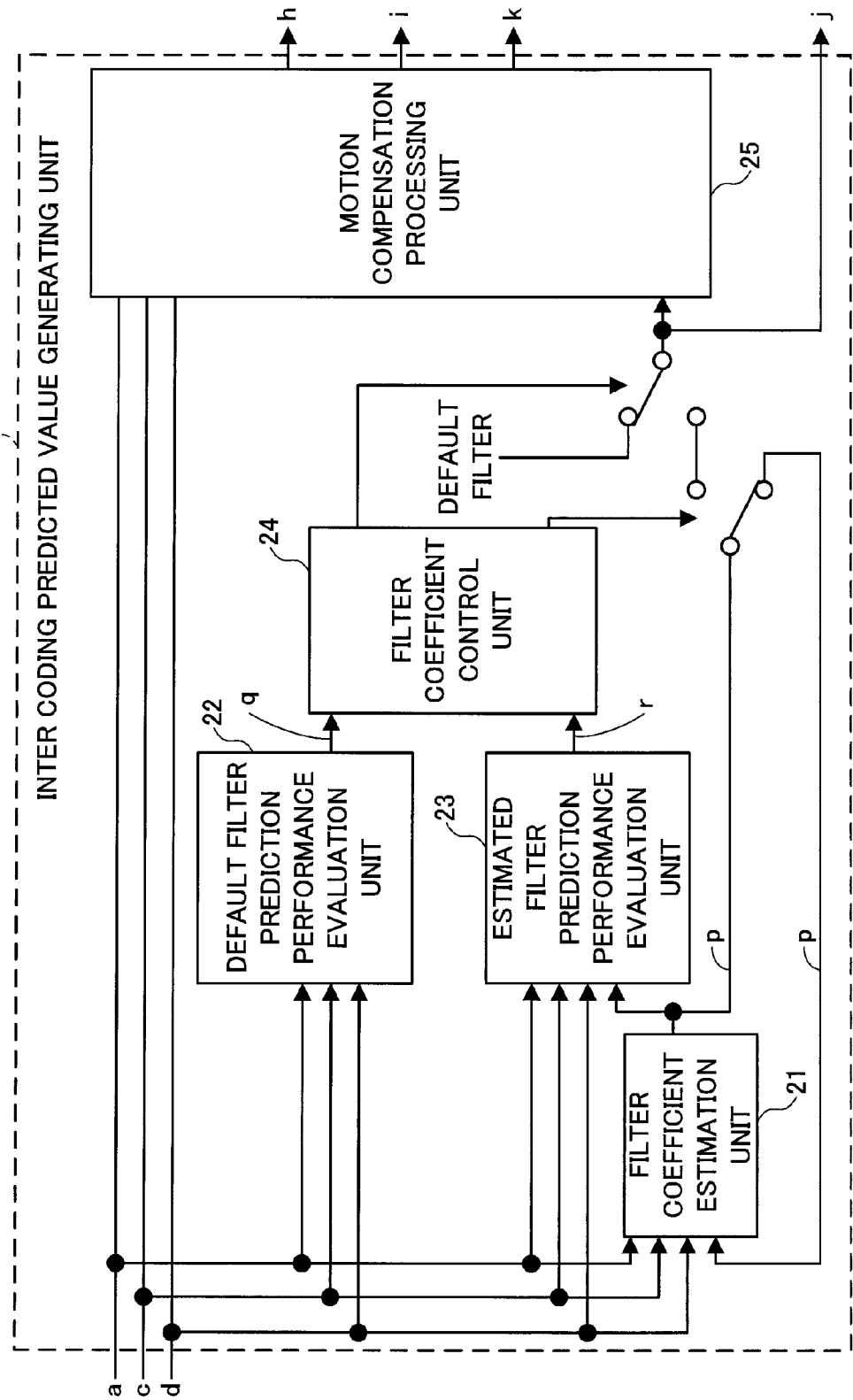
FIG. 2 is a block diagram which shows a configuration of an inter coding predicted value generating unit included in the video encoding apparatus.

FIG. 2 is a block diagram which shows a configuration of an inter coding predicted value generating unit 2. The inter coding predicted value generating unit 2 includes a filter coefficient estimation unit 21, a default filter prediction performance evaluation unit 22, an estimation filter prediction performance evaluation unit 23, a filter coefficient control unit 24, and a motion compensation processing unit 25.

The filter coefficient estimation unit 21 receives, as input data, the input image a, the local decoded values c with respect to the encoded block, and the prediction information d with respect to the encoded block. Furthermore, in some cases, the filter coefficient estimation unit 21 further receives, as input data, estimated interpolation filter coefficients p described later.

When the estimated interpolation filter coefficients p are not input, i.e., when a loopback control operation described later is not performed by the filter coefficient control unit 24, and, more specifically, in the first loop for estimating the interpolation filter coefficients with respect to the current frame to be processed, the filter coefficient estimation unit 21 estimates the motion compensation error based upon the local decoded values c with respect to the encoded block, the prediction information d with respect to the encoded block, and the default filter coefficients. Furthermore, the filter coefficient estimation unit 21 performs a frequency characteristic analysis of the motion compensation error thus estimated, and performs a frequency characteristic analysis of the input image a. Subsequently, the filter coefficient control unit 24 estimates the interpolation filter coefficients based upon the results of the frequency characteristic analysis, and outputs the estimated result as the estimated interpolation filter coefficients p. It should be noted that, in the present embodiment, the filter coefficients used in H.264 are employed as the aforementioned default filter coefficients. The default filter coefficients are stored in an unshown storage unit.

On the other hand, when the estimated interpolation filter coefficient p are input, i.e., when the loopback control operation described later is performed by the filter coefficient control unit 24, and, more specifically, in or after the second loop for estimating the interpolation filter coefficients with respect to the current frame to be processed, the filter coefficient estimation unit 21 estimates the motion compensation error based upon the local decoded value c with respect to the encoded block, the prediction information d with respected to the encoded block, and the estimated interpolation filter coefficients p thus input. Furthermore, the filter coefficient estimation unit 21 performs a frequency characteristic analysis of the motion compensation error thus estimated, and performs a frequency characteristic analysis of the input image a. Subsequently, the filter coefficient estimation unit 21 estimates the interpolation filter coefficients again based upon the frequency characteristic analysis result, and outputs the result thus re-estimated as the updated estimated interpolation filter coefficients p.

The default filter prediction performance evaluation unit 22 receives, as input data, the input image a, the local decoded value c with respect to the encoded block, and the prediction information d with respect to the encoded block. The default filter prediction performance evaluation unit 22 generates an expected MC predicted value estimated with respect to the default filter coefficients, based upon the local decoded value c with respect to the encoded block, the prediction information d with respect to the encoded block, and the aforementioned default filter coefficients. Furthermore, the default filter prediction performance evaluation unit 22 evaluates the expected MC error based upon the input image a and the MC predicted value thus generated, calculates the MC error evaluation value, and outputs the calculation result as the expected MC error evaluation value q estimated with respect to the default filter coefficients.

The estimated filter prediction performance evaluation unit 23 receives, as input data, the input image a, the local decoded value c with respect to the encoded block, the prediction information d with respect to the encoded block, and the estimated interpolation filter coefficients p.

When the loopback control operation described later is not performed by the filter coefficient control unit 24, i.e., in the first loop for estimating the interpolation filter coefficient with respect to the current frame to be processed, the estimated filter prediction performance evaluation unit 23 generates the expected MC predicted value estimated with respect to the estimated interpolation filter coefficients p, based upon the local decoded value c with respect to the encoded block, the prediction information d with respect to the encoded block, and the estimated interpolation filter coefficients p. Furthermore, the estimated filter prediction performance evaluation unit 23 evaluates the expected MC error based upon the input image a and the MC predicted value thus generated, calculates the MC error evaluation value, and outputs the calculated result as the expected MC error evaluation value r estimated with respect to the estimated interpolation filter coefficients p.

On the other hand, when the loopback control operation described later is performed by the filter coefficient control unit 24, i.e., in or after the second loop for estimating the interpolation filter coefficients with respect to the current frame to be processed, first, the estimated filter prediction performance evaluation unit 23 simulates motion compensation (MC) with fractional pixel position accuracy, as described below. Specifically, the estimated filter prediction performance evaluation unit 23 simulates motion compensation (MC) with fractional pixel position accuracy with respect to the updated estimated interpolation filter coefficients p which are obtained by re-estimation performed in the filter coefficient estimation unit 21, based upon the pixel values of the original image in the frame to be processed, which are used by the filter coefficient estimation unit 21 in the step for calculating the estimated interpolation filter coefficients p that are fed back to the filter coefficient estimation unit 21 in the loopback control operation described later, the pixel values of the encoded image of the reference frame, and the motion vector information. Next, the estimated filter prediction performance evaluation unit 23 evaluates the expected MC error based upon the simulation result, calculates the MC error evaluation value, and outputs the evaluation result as the expected MC error evaluation value r estimated with respect to the updated estimated interpolation filter coefficients p.

It should be noted that, in order to simulate the motion compensation (MC) with fractional pixel position accuracy, the estimated filter prediction performance evaluation unit 23 holds the pixel values of the original image of the frame to be processed, the pixel values of the encoded image of the reference frame, and the motion vector information, which are used by the filter coefficient estimation unit 21 to calculate the estimated interpolation filter coefficients p that are fed back to the filter coefficient estimation unit 21 in the loopback control operation described later, during a period in which the loopback control operation is continuously performed, i.e., until the estimated interpolation filter coefficients p or the default filter coefficients are output as the interpolation filter coefficients j.

In the operation for calculating the aforementioned MC error evaluation value, such an arrangement may calculate the sum of absolute differences or the error sum of squares.

The filter coefficient control unit 24 receives, as input data, the expected MC error evaluation value q estimated with respect to the default filter coefficients, and the expected MC error evaluation value r estimated with respect to the estimated interpolation filter coefficient p. The filter coefficient control unit 24 makes a comparison between the two input evaluation values, and judges that the filter coefficients that correspond to the lower of the evaluation values are suitable for use, and performs an operation that corresponds to the comparison result.

Figure 3:
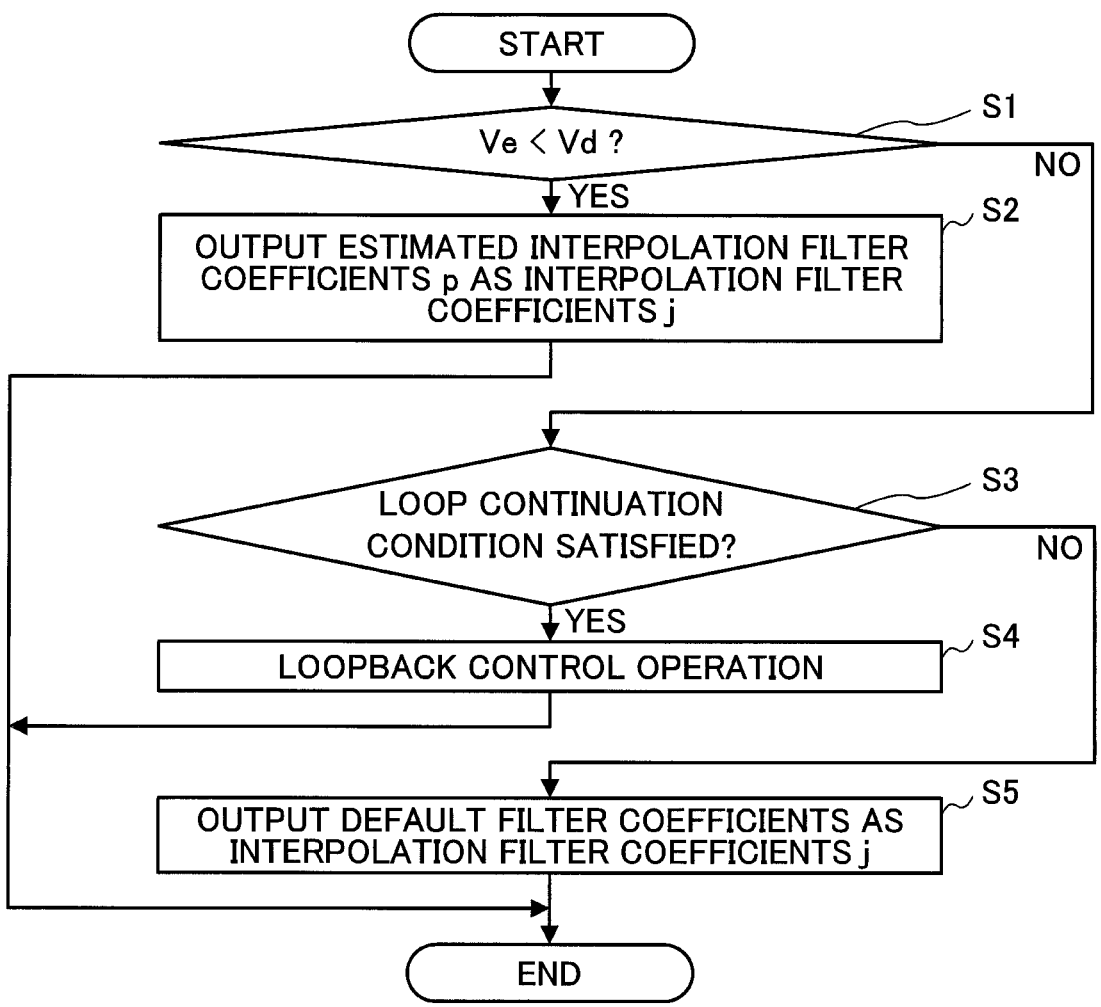
FIG. 3 is a flow chart which shows the operation of a filter coefficient control unit included in the inter coding predicted value generating unit.

FIG. 3 is a flowchart which shows a filter coefficient control operation performed by the filter coefficient control unit 24.

In Step S1, the expected MC error evaluation value q estimated with respect to the default filter coefficients is compared with the expected MC error evaluation value r estimated with respect to the estimated interpolation filter coefficients p. Description will be made below with the expected MC error evaluation value q estimated with respect to the default filter coefficients as Vd, and with the expected MC error evaluation value r estimated with respect to the estimated interpolation filter coefficients p as Ve. With such an arrangement, when Ve is smaller than Vd, judgment is made that the estimated interpolation filter coefficients are more suitable for use than the default filter coefficients, and the flow transits to Step S2. Conversely, when Ve is equal to or greater than Vd, judgment is made that the default filter coefficients are more suitable for use than the estimated interpolation filter coefficients p, and the flow transits to Step S3.

In Step S2, the estimated interpolation filter coefficients p are output as the interpolation filter coefficients j, and the filter coefficient control processing ends.

In Step S3, judgment is made whether or not the loop continuation condition is satisfied. When the loop continuation condition is satisfied, the flow transits to the processing in Step S4, and when the loop continuation condition is not satisfied, the flow transits to the processing in Step S5. It should be noted that the following three conditions are employed as the loop continuation condition. When all three conditions are satisfied, judgment is made that the loop continuation condition is satisfied.

The first condition is that the number of times the loopback control operation described later is consecutively performed in Step S4 is smaller than a predetermined upper limit. By setting such an upper limit, such an arrangement is capable of limiting the number of times such a loopback control operation is performed for each frame to be processed.

The second condition is that, with respect to the expected MC error evaluation value r estimated with respect to the estimated interpolation filter coefficients p for the current frame to be processed, the difference between such a expected MC error evaluation value r estimated with respect to the estimated interpolation filter coefficients p obtained in the previous loop and that estimated with respect to the estimated interpolation filter coefficients p calculated in the current loop is greater than a predetermined threshold. By setting such a threshold, such an arrangement is capable of not performing such a loopback control operation if there is a small improvement in the current loop, indicated by the expected MC error evaluation value, as compared with the previous loop.

The third condition is that the expected MC error evaluation value r estimated with respect to the estimated interpolation filter coefficients p, which are to be applied to the current frame to be processed, that have been calculated in the current loop is smaller than that calculated in the previous loop. Thus, such an arrangement is capable of not performing the loopback control operation if there is no improvement in the current loop, indicated by the expected MC error evaluation value, as compared with the previous loop.

It should be noted that, in order to judge whether or not the aforementioned second and third conditions are satisfied, the filter coefficient control unit 24 holds the two most recent expected MC error evaluation values r estimated with respect to the aforementioned estimated interpolation filter coefficients p.

In Step S4, the loopback control operation is performed, and the filter coefficient control operation ends. In the loopback control operation, re-estimation of the interpolation filter coefficients is performed. Accordingly, the estimated interpolation filter coefficients p output from the filter coefficient estimation unit 21 are fed back to the filter coefficient estimation unit 21. With such an arrangement, the estimated interpolation filter coefficients p are input to the filter coefficient estimation unit 12 as described above.

In Step S5, the aforementioned default filter coefficients are output as the interpolation filter coefficients j, and the filter coefficient control operation ends.

It should be noted that the evaluation scale used in calculation of the MC error evaluation value estimated with respect to the filter coefficient initial values is taken to be the same as that in the default filter prediction performance evaluation unit 22 and the estimated filter prediction performance evaluation unit 23.

Returning to FIG. 2, the motion compensation processing unit 25 receives, as input signals, an input video image a, a local decoded value c with respect to the encoded block, the prediction information d with respect to the encoded block, and the interpolation filter coefficients j. The motion compensation processing unit 25 performs motion compensation prediction for the encoded block based upon the input image a, and the local decoded value c with respect to the encoded block, so as to obtain a motion vector. Furthermore, the motion compensation processing unit 25 calculates the difference between the motion vector thus obtained and the predicted vector calculated based upon the prediction information d with respect to the encoded block, so as to obtain the inter prediction information to be encoded. Furthermore, the motion compensation processing unit 25 calculates the cost value required to perform the inter coding operation, based upon the prediction error and the amount of coding generated. Subsequently, the motion compensation processing unit 25 outputs the information thus obtained as the inter predicted value h, the inter prediction information (including the motion vector) i, and the encoding cost value k.

Returning to FIG. 1, the mode decision control unit 3 receives, as input signals, the encoding cost value g output from the intra coding predicted value generating unit 1 and the encoding cost value k output from the inter coding predicted value generating unit 2. The mode decision control unit 3 makes a comparison between the encoding cost values g and k, and selects an encoding mode suitable for the processing block.

The DCT/quantization unit 4 receives, as an input signal, the difference between the input video image a and a predicted value selected from either the intra predicted value e or the inter predicted value h according to the encoding mode selected by the mode decision control unit 3. That is, with respect to the selection of either the intra predicted value e or the inter predicted value h according to the corresponding encoding mode selected by the mode decision control unit 3, when intra coding is selected by the mode decision control unit 3, the intra predicted value e is selected as the predicted value, and when inter coding is selected by the mode decision control unit 3, the inter predicted value h is selected. The DCT/quantization unit 4 performs DCT processing and quantization processing on the input signal, and outputs the resulting signal in the form of a quantized DCT coefficient (residual signal) m.

The IDCT/inverse quantization unit 5 receives, as an input signal, the quantized DCT coefficient (residual signal) m. The IDCT/inverse quantization unit 5 performs inverse quantization processing and inverse DCT processing on the input signal, and outputs the resulting signal as a pixel signal n subjected to inverse DCT.

The entropy coding unit 6 receives, as input signals, the prediction information selected from either the intra prediction information (including motion vector) f or the inter prediction information (including motion vector) i according to the encoding mode selected by the mode decision control unit 3, the interpolation filter coefficients j, and the quantized DCT coefficient (residual signal) m. That is, with respect to the selection of either the intra prediction information (including motion vector) f or the inter prediction information (including motion vector) i according to the encoding mode selected by the mode decision control unit 3, when intra coding is selected by the mode decision control unit 3, the intra coding information (including motion vector) f is selected as the prediction information, and when inter coding is selected by the mode decision control unit 3, the inter prediction information (including motion vector) i is selected. The entropy coding unit 6 performs entropy coding processing, and outputs the resulting signal as encoded data b.

The first local memory 7 receives, as an input signal, a signal obtained by summing the predicted value selected from either the intra predicted value e or the inter predicted value h according to the encoding mode selected by the mode decision control unit 3 and the pixel signal n subjected to inverse DCT, i.e., the local decoded value c with respect to the encoded block. The first local memory 7 stores the local decoded value c with respect to the encoded block, and, as appropriate, supplies the local decoded value c thus stored to the intra coding predicted value generating unit 1 and the inter coding predicted value generating unit 2.

The second local memory 8 receives, as an input signal, the prediction information selected from either the intra prediction information (including motion vector) f or the inter prediction information (including motion vector) i according to the encoding mode selected by the mode decision control unit 3, i.e., the prediction information d with respect to the encoded block. That is, with respect to the selection of either the intra prediction information (including motion vector) f or the inter prediction information (including motion vector) i according to the corresponding encoding mode selected by the mode decision control unit 3, when intra coding is selected by the mode decision control unit 3, the intra prediction information (including motion vector) f is selected as the prediction information, and when inter coding is selected by the mode decision control unit 3, the inter prediction information (including motion vector) i is selected. The second local memory 2 stores the prediction information d with respect to the encoded block, and, as appropriate, supplies the prediction information d thus stored to the intra coding predicted value generating unit 1 and the inter coding predicted value generating unit 2.

Figure 4:
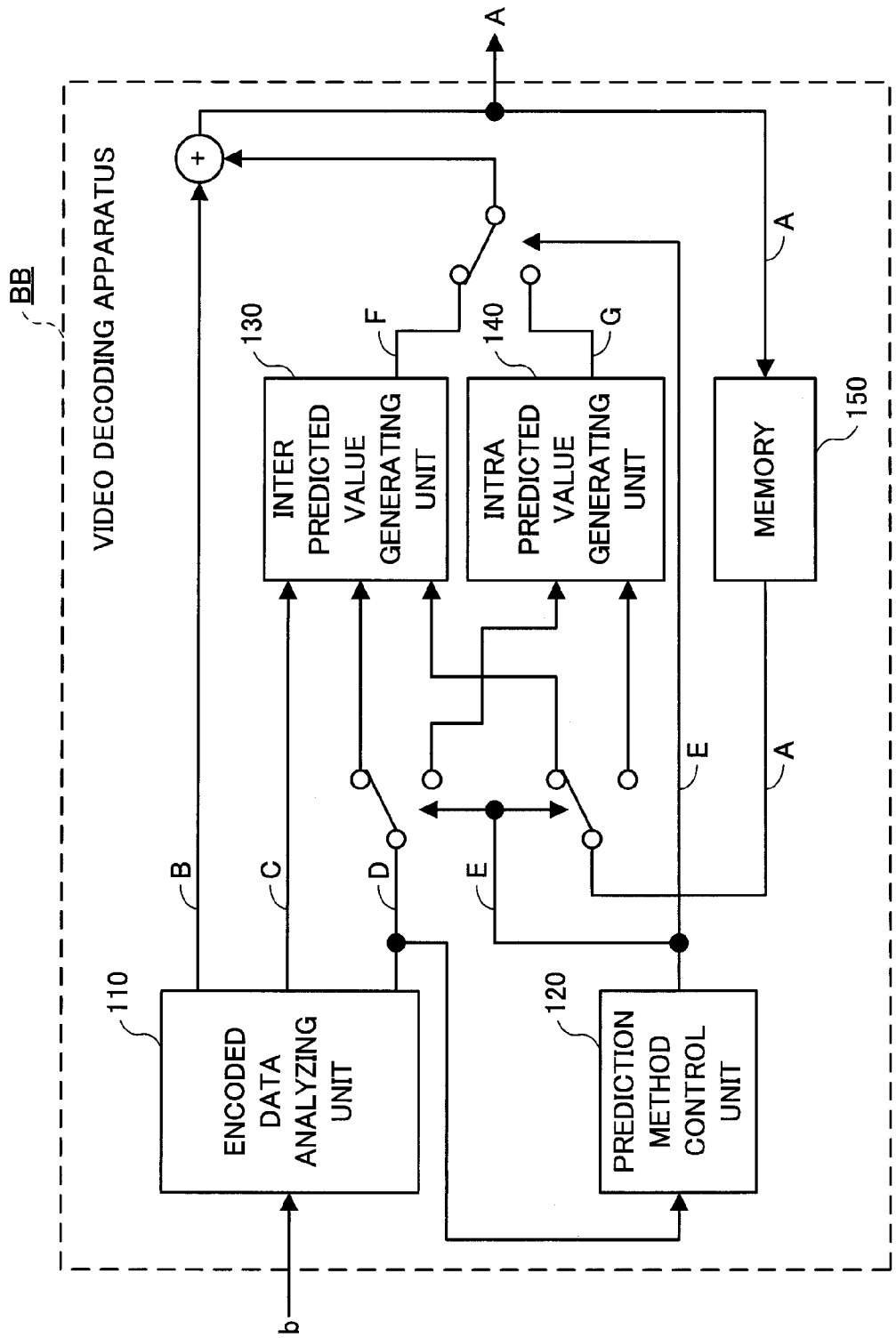
FIG. 4 is a block diagram which shows a configuration of a video decoding apparatus according to an embodiment of the present invention.

FIG. 4 is a block diagram which shows a configuration of a video decoding apparatus BB according to the first embodiment of the present invention. The video decoding apparatus BB includes an encoded data analyzing unit 110, a prediction method control unit 120, an inter predicted value generating unit 130, an intra predicted value generating unit 140, and memory 150, and is configured to decode the encoded data b generated by the video encoding apparatus AA.

The encoding data analyzing unit 110 receives the encoded data b as an input signal. First, the encoded data analyzing unit 110 analyzes the content recorded in the encoded data b according to the coding syntax, and entropy decodes the encoded data b. Furthermore, the encoding data analyzing unit 110 outputs the residual signal B, the interpolation filter coefficients C, and the prediction information D, which are obtained as the results of the entropy decoding.

The prediction method control unit 120 receives, as an input signal, the prediction information D. The prediction method control unit 120 judges whether the prediction information D corresponds to the intra prediction or the inter prediction, and outputs a control signal E which is used to switch the mode between intra prediction and the inter prediction.

The inter predicted value generating unit 130 receives the interpolation filter coefficients C as an input signal. Furthermore, in some cases, the inter predicted value generating unit 130 receives, as input signals, the decoded pixel value A and the prediction information D according to the control signal E. Specifically, when the prediction method control unit 120 identifies the prediction information D as being related to inter prediction, the decoded pixel value A and the prediction information D are input to the inter predicted value generating unit 130. The inter predicted value generating unit 130 generates an inter predicted value F based upon the decoded pixel value A according to the prediction information D, and outputs the inter predicted value F thus generated.

In some cases, the intra predicted value generating unit 140 receives, as input signals, the decoded pixel value A and the prediction information D according to the control signal E. Specifically, when the prediction method control unit 120 identifies the prediction information D as being related to intra prediction, the decoded pixel value A and the prediction information D are input to the intra predicted value generating unit 140. The intra predicted value generating unit 140 generates an intra predicted value G based upon the decoded pixel value A according to the prediction information D, and outputs the intra predicted value G thus generated.

The memory 150 receives a signal obtained by summing the residual signal B and a predicted value that has been selected, from either the inter predicted value F or the intra predicted value G, according to the control signal E, i.e., receives the decoded pixel value A as an input signal. That is, with respect to the selection of either the inter predicted value F or the intra predicted value G according to the control signal E, when the prediction method control unit 120 identifies the prediction information D as being related to inter prediction, the inter predicted value F is selected, and when the prediction method control unit 120 identifies the prediction information D as being related to intra prediction, the intra predicted value G is selected. The memory 150 stores the decoded pixel value A thus input. When decoding processing is to be performed for a block that has not been decoded, the memory 150 supplies the decoded pixel value A to the inter predicted value generating unit 130 or the intra predicted value generating unit 140, as appropriate.

With the video encoding apparatus AA described above, the interpolation filter coefficients are estimated by means of the image frequency characteristics analysis by the filter coefficient estimation unit 21. Thus, such an arrangement provides a reduction in the processing cost required to calculate the interpolation filter coefficients j, as with the method described in Tomonobu Yoshino et al.

Furthermore, with the video encoding apparatus AA, when the loop continuation condition is satisfied in Step S3, re-estimation of the interpolation filter coefficients is performed. Thus, such an arrangement provides improved coding performance.

Furthermore, with such a video encoding apparatus AA, such an arrangement is capable of calculating the MC error evaluation value using the sum of absolute differences or the error sum of squares, for example.

With such a video encoding apparatus AA, when the aforementioned three conditions that compose the loop continuation condition are all satisfied in Step S3, judgment is made that the loop continuation condition is satisfied. Thus, such an arrangement is capable of limiting the number of times re-estimation of the interpolation filter coefficients is performed. Furthermore, such an arrangement is capable of stopping the re-estimation if there is a small improvement in the current loop of estimation. Thus, such an arrangement suppresses an increase in the processing cost required to calculate the interpolation filter coefficients j.

Furthermore, with such a video encoding apparatus AA, when Ve is smaller than Vd, the estimated interpolation filter coefficients p are output as the interpolation filter coefficients j. On the other hand, when Ve is equal to or greater than Vd, judgment is made regarding whether or not the loop continuation condition is satisfied. When the loop continuation condition is satisfied, re-estimation is performed, and when the loop continuation condition is not satisfied, the default filter coefficients are output as the interpolation filter coefficients j. Thus, by setting the default filter coefficients to suitable values, such an arrangement is capable of providing further improved coding performance while further reducing the processing cost required to calculate the interpolation filter coefficients j.

It should be noted that the present embodiment provides improved image quality on the order of 0.04 dB on average with respect to an HD image, while suppressing the increase in the processing cost to 1% or less, as compared with an arrangement employing a low processing cost AIF (Adaptive Interpolation Filter) method without involving such a video encoding apparatus AA.

It should be noted that the operation of the video encoding apparatus AA or the operation of the image decoding apparatus BB may be stored in a computer-readable storage medium. Also, the video encoding apparatus AA or the video decoding apparatus BB may read out a program stored in a storage medium, and may execute the program thus read out. Such an arrangement also provides the present invention.

Also, the aforementioned program may be transmitted from the video encoding apparatus AA or the video decoding apparatus BB, which stores the program in a storage device, to another computer system via a transmission medium or transmission wave in a transmission medium. The term "transmission medium" as used here represents a medium having a function of transmitting information, examples of which include a network (communication network) such as the Internet, etc., a communication link (communication line) such as a phone line etc.

Also, the aforementioned program may be configured to provide a part of the aforementioned functions. Also, the aforementioned program may be configured to provide the aforementioned functions in combination with a different program already stored in the video encoding apparatus AA or the video decoding apparatus BB. That is to say, the aforementioned program may be configured as a differential file (differential program).

Detailed description has been made regarding the embodiments of the present invention with reference to the drawings. However, the specific configuration thereof is not restricted to the above-described embodiments. Rather, any modifications may be made without departing from the spirit of the present invention.

For example, description has been made in the aforementioned embodiments regarding an arrangement in which the filter coefficients used in H.264 are employed as the default filter coefficients. However, the present invention is not restricted to such an arrangement. For example, the filter coefficients used in DCT-IF disclosed in K. Ugur, et al., "Video coding technology proposal by Tandberg, Nokia, and Ericsson", JCTVC-A119, April 2010, the filter coefficients used in DIF disclosed in M. Karczewicz, et al., "Video coding technology proposal by Qualcomm", JCTVC-A121, April 2010, or the filter coefficients used in SIFO disclosed in K. McCann, et al., "Video coding technology proposal by Samsung (and BBC)", JCTVC-A124, April 2010 may be employed as the default filter coefficients.

Description has been made in the aforementioned embodiments regarding an arrangement in which the aforementioned three conditions are employed in Step S3 as the loop continuation condition. However, the present invention is not restricted to such an arrangement. For example, an arrangement may be made having the following fourth condition as an additional condition. That is to say, such an arrangement may hold the expected MC error evaluation values r estimated with respect to the estimated interpolation filter coefficients p for the N most recent times the loopback control operation is consecutively performed (N is an integer which satisfies the relation $1 \leq N \leq M$, where M is the number of times the loopback control operation has been consecutively performed). With such an arrangement, the fourth condition may be that variation in the evaluation values r for the N most recent times the loopback control operation has been consecutively performed is equal to or greater than a predetermined threshold value. Also, such an arrangement may have a fifth condition as an additional condition, in which the expected MC error evaluation value r estimated with respect to the estimated interpolation filter coefficients p is smaller than a predetermined threshold value. Also, at least one of the aforementioned conditions may be combined and used as the loop continuation condition.

Description has been made in the aforementioned embodiments regarding an arrangement in which judgment is made regarding whether or not the aforementioned three conditions are all satisfied in Step S3, which is used as the loop continuation condition. However, the present invention is not restricted to such an arrangement. Also, an arrangement may be made in which judgment is made regarding whether or not at least one of the aforementioned three conditions is satisfied. Also, an arrangement may be made in which at least two of the aforementioned three conditions are satisfied.

Description has been made in the aforementioned embodiments regarding an arrangement in which the expected MC error evaluation value q estimated with respect to the default filter coefficients is used as Vd. However, the present invention is not restricted to such an arrangement. Also, a predetermined threshold value may be used as Vd.

While preferred embodiments of the invention have been described and illustrated above, it should be noted that these are example embodiments of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF THE REFERENCE NUMERALS

AA video encoding apparatus
RB video decoding apparatus
1 intra coding predicted value generating unit
2 inter coding predicted value generating unit
3 mode decision control unit
4 DCT/quantization unit
5 IDCT/inverse quantization unit
6 entropy coding unit
7 first local memory
8 second local memory
9 third local memory
21 filter coefficient estimation unit
22 default filter prediction performance evaluation unit
23 estimated filter prediction performance evaluation unit
24 filter coefficient control unit
25 motion compensation processing unit

What is claimed is:

1. A video encoding apparatus configured to allow filtering processing to be performed for a predicted value in an inter-frame prediction, the video encoding apparatus comprising:
a filter coefficient calculation unit configured to calculate fractional pixel motion compensation interpolation filter coefficients, with fractional pixel position accuracy, based upon results of a frequency characteristic analysis of an input image and an encoded image;
a prediction performance evaluation unit configured to evaluate motion compensation prediction performance with respect to the interpolation filter coefficients calculated by the filter coefficient calculation unit; and
a filter coefficient control unit configured to judge whether or not recalculation of the interpolation filter coefficients is to be performed by the filter coefficient calculation unit, based upon an evaluation result obtained by the prediction performance evaluation unit,
wherein, when judgment is made by the filter coefficient control unit that recalculation is to be performed, the filter coefficient calculation unit performs recalculation of the interpolation filter coefficients using the interpolation filter coefficients on the basis of which judgment was made that recalculation was to be performed, and
wherein, when judgment is made by the filter coefficient control unit that recalculation is to be performed, the prediction performance evaluation unit evaluates motion compensation prediction performance with respect to the interpolation filter coefficients calculated in the recalculation performed by the filter coefficient calculation unit, using the motion vector information and the encoded image that were used by the filter coefficient calculation unit to calculate the interpolation filter coefficients on the basis of which judgment was made that recalculation was to be performed, the video encoding apparatus further comprising a default performance evaluation unit configured to evaluate the motion compensation prediction performance with respect to predetermined filter coefficients, wherein the filter coefficient control unit judges which from among the interpolation filter coefficients calculated by the filter coefficient calculation unit and the predetermined filter coefficients are suitable for use, based upon evaluation results obtained by the prediction performance evaluation unit and evaluation results obtained by the default performance evaluation unit, and wherein, when judgment is made that the predetermined filter coefficients are suitable for use, judgment is made whether or not recalculation is to be performed.

2. A video encoding apparatus according to claim 1, wherein the prediction performance evaluation unit is configured to evaluate the motion compensation prediction performance using a sum of absolute differences or an error sum of squares with respect to the motion compensation error.

3. A video encoding apparatus according to claim 1, wherein the filter coefficient control unit is configured to perform at least one from among:

a first judgment procedure, in which an evaluation value obtained by the prediction performance evaluation unit is compared with a predetermined threshold value;

a second judgment procedure, in which the difference between the evaluation value obtained by the prediction performance evaluation unit and an evaluation value obtained by the prediction performance evaluation unit in a previous evaluation loop is calculated, and the difference thus calculated is compared with a predetermined threshold;

a third judgment procedure, in which variation in the evaluation values obtained by the prediction performance evaluation unit is calculated for the N most recent evaluation loops (N is an integer which is equal to or greater than 1), and the variation thus calculated is compared with a predetermined threshold value; and a fourth judgment procedure, in which the number of times recalculation has been consecutively performed according to judgment made by the filter coefficient control unit is compared with a predetermined threshold value, wherein judgment is made regarding whether or not recalculation is to be performed based upon the judgment result.

4. A video encoding apparatus according to claim 1, wherein the filter coefficient control unit has a first input, a second input, and a set of outputs, the first input receiving an expected motion control error evaluation value (q) estimated with respect to the predetermined filter coefficients, the second input receiving an expected motion control error evaluation value (r) estimated with respect to the interpolation filter coefficients (p), and the set of outputs for selecting either (i) the predetermined filter coefficients or (ii) the interpolation filter coefficients (p) for provision to an input of the filter coefficient calculation unit, for use in calculating another set of interpolation filter coefficients (p).

5. A video encoding apparatus according to claim 4, wherein the filter coefficient control unit is constructed and arranged to select the predetermined filter coefficients for provision to an input of the filter coefficient calculation unit when q<r; and to select the interpolation filter coefficients (p) for provision to an input of the filter coefficient calculation unit when q>r.

6. A video encoding apparatus according to claim 5, wherein the predetermined filter coefficients are H.264 filter coefficients.

7. A video encoding method for allowing filtering processing to be performed for a predicted value in an inter-frame prediction, the video encoding method comprising:

a first step in which fractional pixel motion compensation filter coefficients are calculated, with fractional pixel position accuracy, based upon results of a frequency characteristic analysis of an input image and an encoded image;

a second step in which motion compensation prediction performance is evaluated with respect to the interpolation filter coefficients calculated in the first step;

a third step in which a selection is made based on whether predetermined filter coefficients produce a higher motion control error evaluation value than do the interpolation filter coefficients calculated in the first step; and a fourth step in which judgment is made regarding whether or not recalculation of the interpolation filter coefficients is to be performed in the first step, based upon evaluation results obtained in the second step, wherein, when judgment is made in the fourth step that recalculation is to be performed, the recalculation of the interpolation filter coefficients is performed in the first step using the interpolation filter coefficients on the basis of which judgment was made that recalculation was to be performed, and wherein, when judgment is made in the fourth step that recalculation is to be performed, motion compensation prediction performance is evaluated in the second step with respect to the interpolation filter coefficients calculated in the recalculation performed in the first step, using motion vector information and the encoded image that were used in the first step to calculate the interpolation filter coefficients on the basis of which judgment was made that recalculation was to be performed.

8. A video encoding method according to claim 7, wherein the third step includes:

receiving an expected motion control error evaluation value (q) estimated with respect to the predetermined filter coefficients, receiving an expected motion control error evaluation value (r) estimated with respect to the interpolation filter coefficients (p), and selecting either (i) the predetermined filter coefficients or (ii) the interpolation filter coefficients (p) for provision to an input of the filter coefficient calculation unit, for use in calculating another set of interpolation filter coefficients (p).

9. A video encoding method according to claim 8, wherein selecting by the filter coefficient control unit selects the predetermined filter coefficients for provision to an input of the filter coefficient calculation unit when q<r and selects the interpolation filter coefficients (p) for provision to an input of the filter coefficient calculation unit when q>r.

10. A video encoding method according to claim 9, wherein the predetermined filter coefficients are H.264 filter coefficients.

11. A computer program product having a non-transitory computer readable medium storing a program which, when executed by a computer, causes the computer to perform a method for allowing filtering processing to be performed for a predicted value in an inter-frame prediction, the method including:
- a first step in which fractional pixel motion compensation filter coefficients are calculated, with fractional pixel position accuracy, based upon results of a frequency characteristic analysis of an input image and an encoded image;
- a second step in which motion compensation prediction performance is evaluated with respect to the interpolation filter coefficients calculated in the first step;
- a third step in which a selection is made based on whether predetermined filter coefficients produce a higher motion control error evaluation value than do the interpolation filter coefficients calculated in the first step; and
- a fourth step in which judgment is made regarding whether or not recalculation of the interpolation filter coefficients is to be performed in the first step, based upon evaluation results obtained in the second step,
- wherein, when judgment is made in the fourth step that recalculation is to be performed, the recalculation of the interpolation filter coefficients is performed in the first step using the interpolation filter coefficients on the basis of which judgment was made that recalculation was to be performed, and
- wherein, when judgment is made in the fourth step that recalculation is to be performed, motion compensation prediction performance is evaluated in the second step with respect to the interpolation filter coefficients calculated in the recalculation performed in the first step, using motion vector information and the encoded image that were used in the first step to calculate the interpolation filter coefficients on the basis of which judgment was made that recalculation was to be performed.

12. A computer program product according to claim 11, wherein the third step includes:
- receiving an expected motion control error evaluation value (q) estimated with respect to the predetermined filter coefficients,
- receiving an expected motion control error evaluation value (r) estimated with respect to the interpolation filter coefficients (p), and
- selecting either (i) the predetermined filter coefficients or (ii) the interpolation filter coefficients (p) for provision to an input of the filter coefficient calculation unit, for use in calculating another set of interpolation filter coefficients (p).

13. A computer program product according to claim 12, wherein selecting by the filter coefficient control unit selects the predetermined filter coefficients for provision to an input of the filter coefficient calculation unit when q<r; and selects the interpolation filter coefficients (p) for provision to an input of the filter coefficient calculation unit when q>r.

14. A computer program product according to claim 13, wherein the predetermined filter coefficients are H.264 filter coefficients.

* * * * *